United States Patent [19]

Stewart et al.

[11] Patent Number: 4,715,531

[45] Date of Patent: Dec. 29, 1987

[54] REUSABLE REMAILABLE ENVELOPE

[76] Inventors: Russell M. Stewart, 1350 Ala Moana Blvd., Suite 1350, Honolulu, Hi. 96814; Rodney A. Gomes, 1760 Hookupa St., Pearl City, Hi. 96782

[21] Appl. No.: 774,437

[22] Filed: Sep. 10, 1985

[51] Int. Cl.⁴ .......................................... B65D 27/06
[52] U.S. Cl. ..................................... 229/73; 229/92.1
[58] Field of Search ........................ 229/73, 92.3, 92.1

[56] References Cited

U.S. PATENT DOCUMENTS

| | | | |
|---|---|---|---|
| 700,352 | 5/1902 | Mosters | 229/73 |
| 895,520 | 8/1908 | Virkus | 229/73 |
| 3,184,150 | 5/1965 | Hubbard | 229/73 |
| 3,507,519 | 4/1970 | McNabb | 229/73 |
| 4,055,294 | 10/1977 | Traise | 229/73 |
| 4,487,360 | 12/1984 | Fisher et al. | 229/73 |

Primary Examiner—Stephen P. Garbe
Attorney, Agent, or Firm—James Creighton Wray; Edward A. Pennington

[57] ABSTRACT

A remailable envelope is constructed of a single sheet folded in half having perforations spaced inward from the non-folded edges. A flap fold is spaced inward parallel to the perforation at the free edge of the back. Adhesive extends between the centerfold and the flap fold on the inner surface of the detachable lateral portions between the perforations and the lateral edges. Adhesive strips with release sheets are attached to the outer back face inside the perforations. Adhesive strips with release sheets are attached to an inside of the flap on the detachable portion between the perforation and the terminal edge. Adhesive strips with release covers are applied to the outer face of the flap inside the perforations. The envelope is preaddressed on the outer front face and may be preaddressed and stamped as a return envelope on the inner front face. In use the flap is folded down and material is placed inside the envelope. The release strip is peeled from the inside of the flap portion and the flap is folded up and the detachable portions outside the perforation at the terminal edges are pressed together. The envelope is mailed. Upon receipt one tears the envelope at the perforations and removes the peripheral portions. To reuse the envelope, one removes the release sheets on the lateral adhesive strips, reverses the central fold, exposing the new face, and presses the lateral portions together making a remailable envelope.

10 Claims, 7 Drawing Figures

REUSABLE REMAILABLE ENVELOPE

BACKGROUND OF THE INVENTION

Many mail pieces contain envelopes for mailing replies. Enclosing return envelopes with packets of information in outer envelopes is costly from the sense of added material, added weight, possible extra postage, and added time in assembling envelope contents and stuffing the outer envelopes. One-way envelopes waste money and paper. The present invention proposes a solution to the problems which exist with the enclosure of return envelopes in commercial mailing pieces.

SUMMARY OF THE INVENTION

A remailable envelope is constructed of a single sheet folded in half. Perforations spaced inward from the non-folded edges form detachable portions along lateral edges and along juxtaposed free edges. A flap fold is spaced inward parallel to the perforation near the free edge of the back. Adhesive extends between the centerfold and the flap fold on the inner face of the detachable lateral portions between the perforations and the lateral edges. Adhesive strips with release sheets are attached to an inside of the flap on the detachable portion between the perforation and the terminal edge.

Adhesive strips with release sheets are applied to the outer face of the back inside the perforations. Lateral adhesive strips extend between the centerfold and the flap fold. An adhesive strip extends inside the perforation on the flap. The envelope is addressed and stamped on the outer front face and may be preaddressed and stamped as a return envelope on the inner front face.

In use, the flap is folded downward and material is placed inside the envelope. The release strips are peeled from the inside of the flap portion. The flap is folded upward, and the detachable portions outside the perforation at the terminal edges are pressed together. The envelope is mailed. Upon receipt, one tears the envelope at the perforations and remove the peripheral portions. To reuse the envelope, one removes the release sheets on the lateral adhesive strips, reverses the centerfold, making the old inner face the new outer face, and presses the lateral portions together making a remailable envelope. One then inserts material in the new envelope, removes the release sheets from the adhesive on the flap at the back, folds up the flap and presses the terminal edge portions together.

A reusable mailing envelope of the present invention has a single sheet of paper with first and second surfaces. The paper is folded medially, forming face and back halves with the second surface on the face and back halves being juxtaposed and the first surface of the face and back halves being remote. The sheet has perforations spaced inward from and parallel with peripheral edges thereof, thereby forming detachable portions along the peripheral edges. Adhesive strips in the detachable portions along lateral edges and activatable adhesive on the second surface of a detachable terminal edge portion complete the first envelope. Activatable adhesive strips are positioned inward from perforations on a back portion of the first surface. The face of the first surface is an addressable and postage bearing area, and the face portion of the second surface is a second addressable and postage bearing area.

The preferred reusable envelope has first and second opposite lateral edges and first and second opposite terminal edges. Halves of each lateral edge portion are juxtaposed when the sheet is folded. The opposite terminal edge portions are juxtaposed when the sheet is folded.

Preferably, the first adhesive strips extend along lateral edge portions of the second face, and the first activatable adhesive strip extends along one detachable terminal edge portion.

The preferred first adhesive strips extend from the fold to a position spaced from the detachable terminal edge portion.

In the preferred embodiment, the second activatable adhesive strips on the back of the first face extend from the fold inside the perforations to a position spaced from the perforation along the terminal edge portion.

In the preferred envelope, the back portion has a second fold extending across the sheet between lateral edges and spaced between the central fold and the terminal edge. A flap portion is thereby formed between the second fold and the terminal edge.

Preferably, the first adhesive strips and the first activatable adhesive strips extend on the first and second faces respectively from the centerfold to the second fold.

The preferred activatable adhesive on the back portion of the first surface comprises adhesive strips positioned inward of the perforations and removable release sheets covering exposed adhesive on the adhesive strips.

The preferred envelope has preprinted postage on the face portion of the first and second surfaces.

The above and further and other objects and features of the invention are apparent in the above and ongoing specification, which includes the claims, which together with the drawings constitute the disclosure.

DETAILED DESCRIPTION OF THE DRAWINGS

Figure 1:
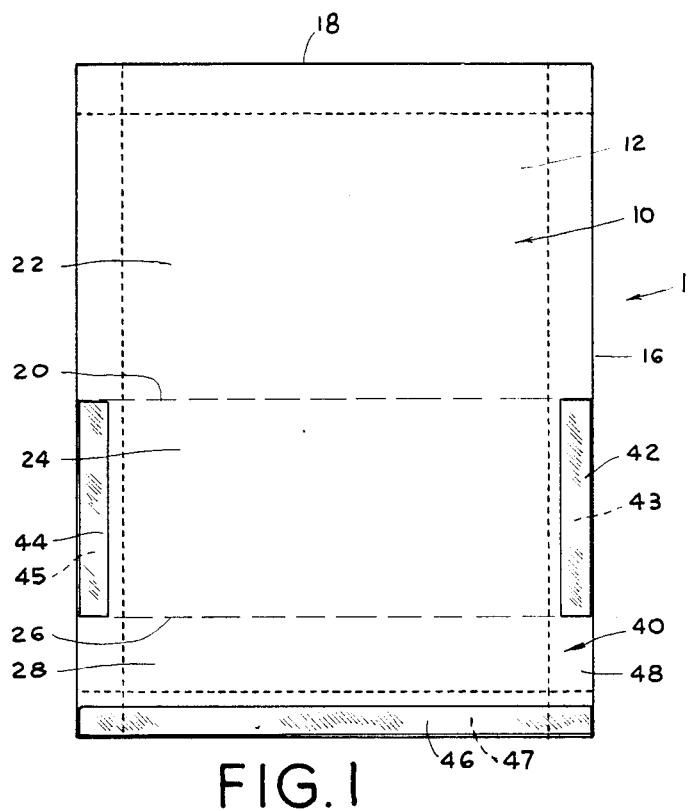
FIG. 1 shows the inner surface of a first envelope side which will become the outer surface of the second envelope.
Figure 2:
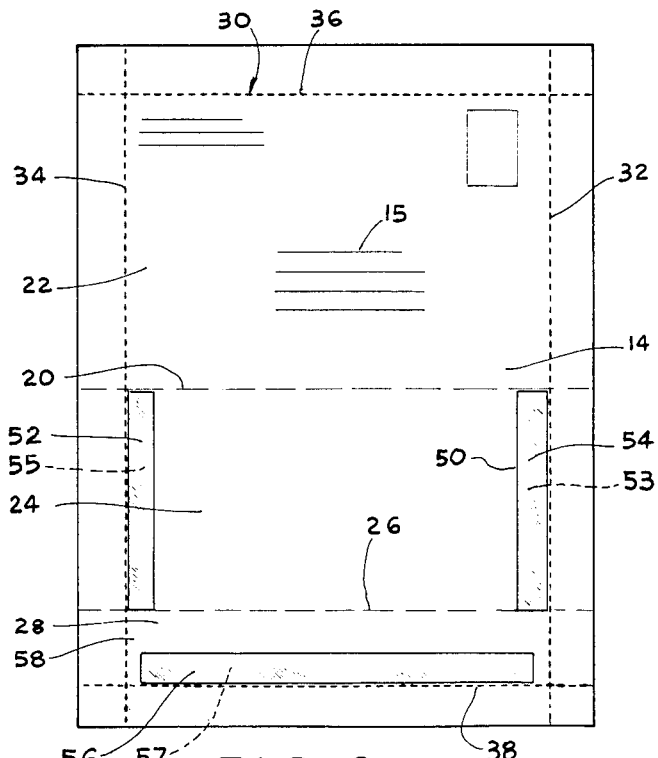
FIG. 2 shows the first outer surface of an envelope blank.

FIGS. 1 and 2 show a reusable envelope generally indicated by the numeral 1. The envelope blank 10 when ready for first use has an inside 12 and an outside 14 which are reversed on the second usage. The outside 14 is generally referred to as the first surface and the inside 12 is generally referred to as the second surface. The envelope blank 10 has lateral edges 16 and end, free, or terminal edges 18. A central fold 20 divides the envelope blank 10 into a face portion 22 and a back portion 24. A fold 26 along the back portion parallel to fold 20 forms a flap 28.

Perforations 30 are formed parallel to peripheral edges 16 and 18 of the envelope. Perforations 32 and 34 are spaced inward from lateral edges 16, and perforations 36 and 38 are spaced inward from terminal edges 18. A detachable portion 40 of the first envelope extends between the perforation lines 30 and the peripheral edges 16 and 18. Lateral release sheets 42 and 44 cover adhesive strips 43 and 45 respectively within the peripheral portions 40. Alternatively the adhesive strips 43 and 45 may be double-sided adhesive strips or brush-sprayed or roll-on adhesive or adhesive which is joined to the detachable areas in any manner. Release strip 46 covers adhesive strip 47. Preferably the adhesive 47 is an type of an activatable adhesive for example a wetable adhesive or a two-part adhesive or a two-sided tape with a release strip 46 as shown. Peripheral detachable areas of 48 of the flap 28 between the adhesive strips 43 and 47 and 45 and 47 are left open to facilitate bending of flap 28 along fold line 26 and to permit insertion of a conventional letter opener.

Adhesive strips 50 are mounted on the back portion 24 of the first outer side 14 immediately inside the perforations 32, 34, and 38. Adhesive strips 50 may be any type of adhesive which is activatable such as by wetting, by preferential adhesion, or simply by removing release strips. Release strips 52 and 54 respectively cover adhesive strips 53 and 55 just inside the lateral perforations 32 and 34. Release strip 56 covers adhesive strip 57 just inside of the perforation 38 by the terminal edge portion. Space 58 is left on a flap 28 between the respective adhesive strips 50 to promote bending of the flap 28 along line 26 and to provide space for insertion of a letter opener.

Figure 3:
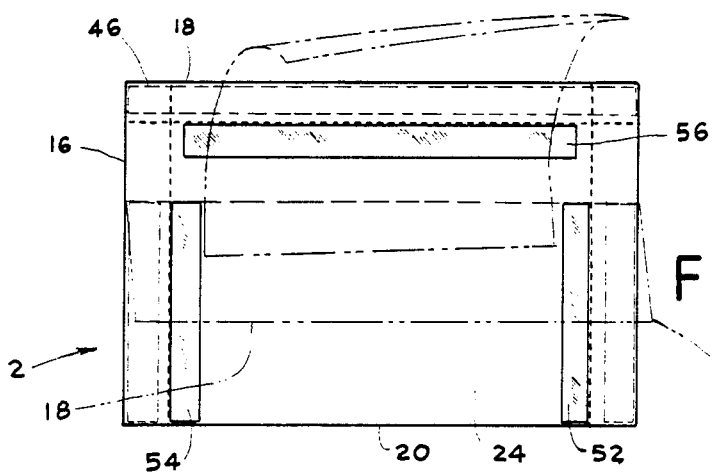
FIG. 3 shows the envelope in assembled form.

As shown in FIG. 3 the envelope ready for first use is generally indicated by the numeral 2. Front and back portions of side edges 16 are juxtaposed and opposite end edges 18 are juxtaposed. Stuffing material is inserted in the envelope while flap 28 is in the downward position as shown in phantom lines. The release coating 46 may be left in place while flap 28 is bent upward.

Figure 4:
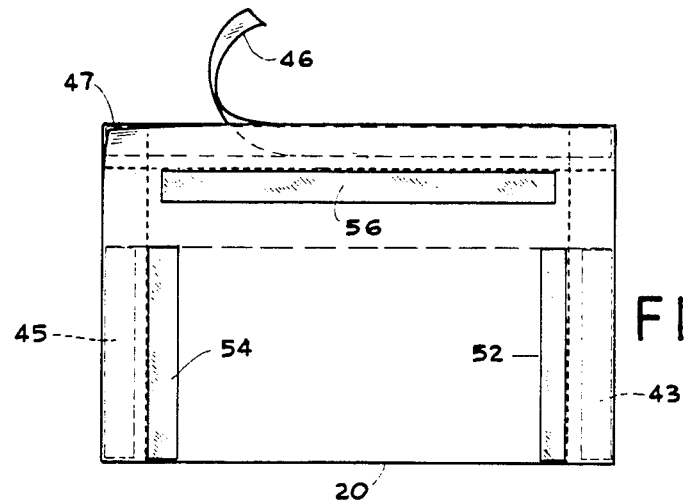
FIG. 4 shows the envelope of FIG. 3 in which the release coating is removed from inside the flap to seal the envelope.
Figure 5:
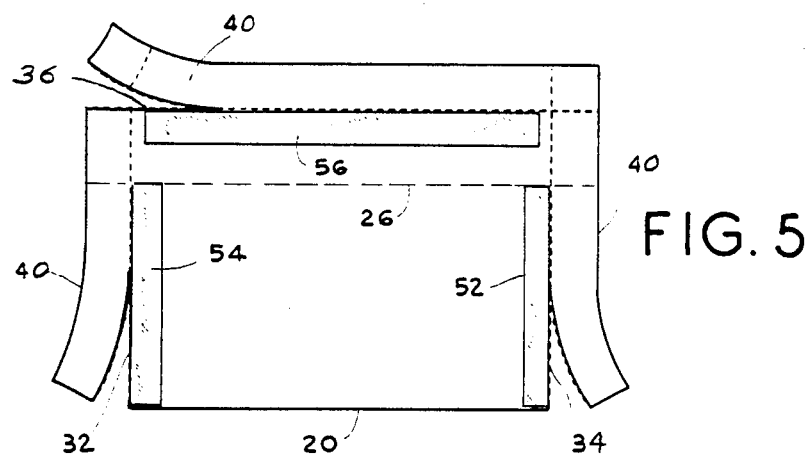
FIG. 5 depicts the once-used envelope during its opening by removing peripheral portions.

As shown in FIG. 4 lateral adhesive strips 43 and 45 are already joined to the opposite surfaces when release strip 46 is removed to expose adhesive 47 to seal the flap.

Release strips 52, 54, and 56 are shown in the position to cover adhesive strips on the back 24 while the first envelope proceeds through the mail.

Upon receiving the first envelope it is opened by tearing off peripheral portions 40 along the lateral perforation lines 32 and 34 and along the end perforation line 36.

Figure 6:
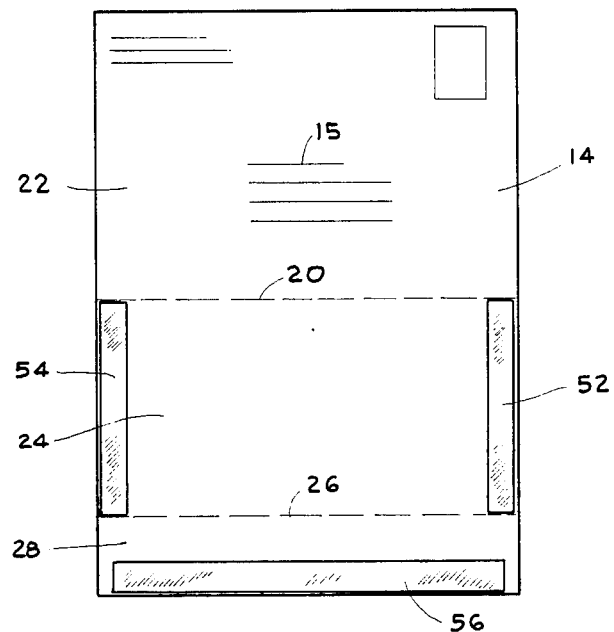
FIG. 6 shows the envelope of FIG. 5 in its open form, ready to remove the release sheets from the lateral adhesives and to refold the envelope.
Figure 7:
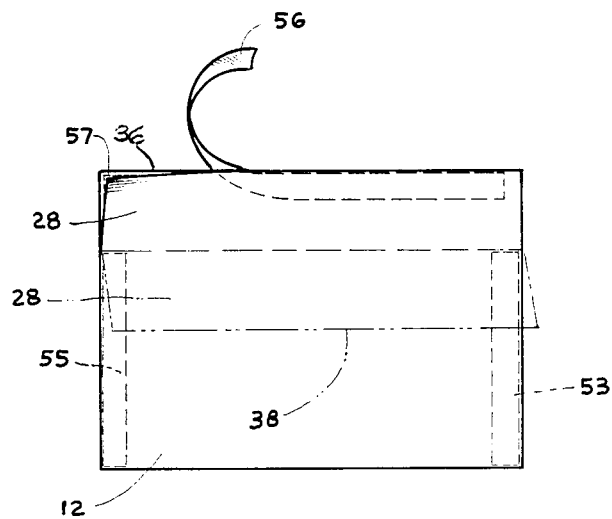
FIG. 7 shows the envelope refolded for its second use with the release sheet being removed from the envelope along the inside of the flap.

To reuse the envelope the fold 20 is straightened as shown in FIG. 6. Release strips 52 and 54 are removed, and the envelope is folded together, juxtaposing halves of the first outer surface 14 and concealing the original address area 15 and postage on the first surface 14 of the face 22. At the same time flap 28 can be reversely bent along fold 26.

With adhesive strips 53 and 55 holding the second envelope in assembled form with the surface 12 on the outside, material is inserted in the envelope with flap 28 in its downward position as shown in phantom lines. The flap is then bent upward juxtaposing the new end edges 36 and 38 and release strip 56 is removed exposing adhesive 57 for completing the sealing of the envelope.

While the invention has been described with reference to specific embodiments, modifications and variations of the invention may be constructed without departing from the scope of the invention.

The scope of the invention is described in the following claims.

We claim:

1. A reusable mailing envelope having a single sheet of paper with first and second surfaces and having a central fold thereby forming face and back portions, with the second surface on the face and back portions being juxtaposed and the first surface of the face and back portions being remote from one another, and the sheet having perforations spaced inward from peripheral edges thereof and extending parallel to the peripheral edges thereby forming detachable portions along the peripheral edges, first adhesive strips on the second surface in the detachable portions along lateral edges and a first activatable adhesive strip on the second surface of a detachable terminal edge portion along a terminal edge, and second activatable adhesive strips positioned inward from perforations on a back portion of the first surface, whereby the face portion of the first surface is an addressable and postage bearing area and wherein the face portion of the second surface is an addressable and postage bearing area.

2. The reusable envelope of claim 1 wherein the envelope has first and second opposite lateral edges and first and second opposite terminal edges and wherein halves of each lateral edge are juxtaposed when the sheet is folded and wherein the terminal edge portions are juxtaposed when the sheet is folded.

3. The envelope of claim 2 wherein the first adhesive strips extend from the fold to a position spaced from the detachable terminal edge portion.

4. The envelope of claim 1 wherein the second activatable adhesive strips on the back portion of the first surface extend from the fold along the perforations to a position spaced from the perforation along the terminal edge portion.

5. The apparatus of claim 1 wherein the back portion further comprises a second fold extending across the sheet between lateral edges the second fold being positioned between the central fold and a terminal edge, thereby forming a flap portion between the second fold and the terminal edge.

6. The apparatus of claim 7 wherein the first adhesive strips and the second activatable adhesive strips extend on the first and second faces respectively from the central fold to the second fold.

7. The apparatus of claim 1 wherein the second activatable adhesive strips on the back portion of the first surface comprises adhesive strips positioned inward of the perforations and removable release sheets covering adhesive on the second activatable adhesive strips.

8. The apparatus of claim 1 wherein the envelope has preprinted postage on the face portions of the first and second surfaces.

9. A remailable envelope comprising a single sheet centrally folded in half forming face and back portions having perforations spaced inward from non-folded edges, a flap fold spaced inward parallel to a perforation at a free edge of said back portion, adhesive extending between the central fold and the flap fold on an inner surface on detachable lateral portions between the perforations and lateral edges, adhesive strips with release sheets attached to the outer surface of the back portion inside the perforations, an adhesive strip with a release sheet attached to an inside of a flap on the detachable portion lying between the perforations at the free edge of the back portion and the free edge, and an adhesive strip with a release sheet on an outer face of the flap inside the perforation.

10. The envelope of claim 9 which is preaddressed on an outer surface of a face portion and which is preaddressed and stamped as a return envelope on an inner surface of a face portion.

* * * * *